E. J. GREGOVSKY.
METAL CLAMP.
APPLICATION FILED JULY 10, 1919.
1,334,151.
Patented Mar. 16, 1920.
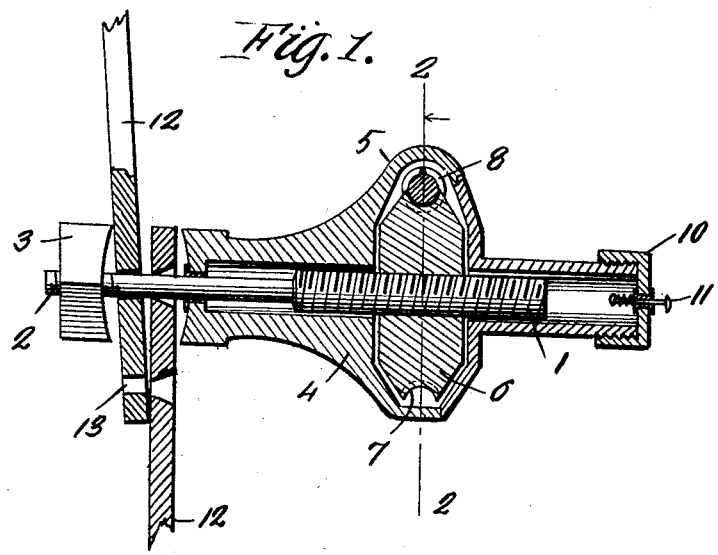
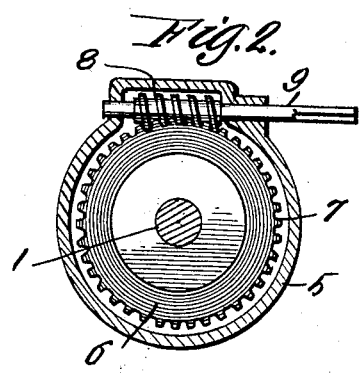
WITNESSES
Guy M. Spring
U. B. Hillyard.
Inventor
EMMANUEL J. GREGOVSKY
By Richard B. Owen
Attorney

UNITED STATES PATENT OFFICE.

EMMANUEL J. GREGOVSKY, OF PENSACOLA, FLORIDA.

METAL CLAMP.

1,334,151.　　　Specification of Letters Patent.　Patented Mar. 16, 1920.

Application filed July 10, 1919.　Serial No. 309,855.

*To all whom it may concern:*

Be it known that I, EMMANUEL J. GREGOVSKY, a citizen of the United States, residing at Pensacola, in the county of Escambia and State of Florida, have invented certain new and useful Improvements in Metal Clamps, of which the following is a specification.

In ship building and in metal working generally it frequently happens that parts to be secured are required to be drawn together by the expenditure of a relatively great amount of force. Particularly is this the case where metal plates to be riveted are required to be drawn into close contact to insure proper set and application of the rivets.

The present invention provides a device which may be used in a relatively small space and which enables the application of a great amount of force so that boiler plates or protecting plates for ships may be drawn closely together and held in such position during the application of rivets or like fastenings, whereby the plates are made secure in the required position.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing,

Figure 1 represents a clamp embodying the invention showing the same in central longitudinal section and as applied for drawing two metal plates into close contact; and Fig. 2 is a section on the line 2—2 of Fig. 1.

Corresponding and like parts are referred to in the following description and indicated in both views of the drawing.

The numeral 1 designates a power screw which is formed with a reduced portion 2 threaded to receive a nut 3 which constitutes a stop or abutment to engage the work upon one side. The power screw 1 is mounted within a casing 4 which is formed intermediate of its ends with an enlargement 5 to receive a nut 6 having worm cogs 7 around its outer edge to coöperate with a worm 8 on a shaft 9 which is mounted in the enlarged portion 5 of the casing at a right angle to the power screw 1. One end of the shaft 9 projects and is of non-circular form in cross section to receive a ratchet wrench or other tool by means of which the shaft 9 and worm 8 may be rotated to impart rotary movement to the power screw 1, whereby the same is caused to move longitudinally within the casing 4. The casing 4 may be of any construction to admit of the ready assembling of the parts and one end is closed by means of a cap 10 to which is fitted a suitable indicator 11, whereby it may be known when the pressure screw has been moved inward to the limit of its travel without causing injury to the device. The end of the casing through which the stem or reduced portion 2 of the power screw passes constitutes an abutment for one side of the work and the faces of the two abutments between which the work is clamped are made concave, thereby insuring proper application of the pressure so as to draw the parts of the work into close contact about the openings therein through which the stem 12 passes and which are designed to receive the rivets or other fastening means, not shown.

In Fig. 1, the numeral 12 designates two metal plates which are required to be drawn into close contact, said plates being provided with openings 13 for reception of the rivets or fastenings. In accordance with the invention, the power screw 1 is moved so as to project the stem or reduced portion 2. The nut 3 is removed from the stem or part 2 and the latter is passed through registering openings of the plates 12. The nut 3 is now placed in position upon the stem 2 and is turned so as to clamp the plates between the part 3 and the abutting end of the casing 4. The power screw 1 is now moved longitudinally within the casing by rotation of the shaft 9, which may be accomplished by means of a ratchet wrench or other tool, not shown, applied to the projecting end of the shaft. As the shaft 9 is rotated the worm 8 meshing with the worm cogs 7 of the nut 6 rotates the latter and effects a longitudinal movement of the power screw, with the result that the plates 12 are ultimately drawn into close contact and are held in such position until a rivet or fastening is introduced through registering openings 13 and made secure in a manner well understood. The clamp is now removed by reversing the rotation of the shaft 9 and after the pressure on the nut 3 has been removed to admit of said nut being unscrewed, it is removed from the stem 2 and the clamp withdrawn and readjusted to the new position where required for service to draw the work together.

It will be understood from the foregoing taken in connection with the accompanying drawing that the invention provides for a simple device which may be effectively operated in a relatively small space for drawing two plates or other parts into close contact and holding the same until made secure, said device admitting of the effective application of a relatively great amount of force for drawing the parts into close contact.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

A device of the character specified, comprising a casing, a power screw mounted within the casing and having a projecting end for engaging the work, an abutment on the projecting end to confine the work between it and the end of the casing, a nut within the casing and mounted upon the power screw, means for rotating the nut to effect a longitudinal movement of the power screw, and an indicator on the casing adapted to be engaged by the inner end of the power screw to designate the innermost position of the latter.

In testimony whereof I affix my signature in presence of two witnesses.

EMMANUEL J. GREGOVSKY.

Witnesses:
HELEN GREGOVSKY,
A. M. GREGOVSKY.